United States Patent
Rodgers et al.

(10) Patent No.: US 6,621,681 B2
(45) Date of Patent: Sep. 16, 2003

(54) LOW VOLTAGE CONTROL OF MEM ACTUATORS

(75) Inventors: Murray Steven Rodgers, Albuquerque, NM (US); Samuel Lee Miller, Albuquerque, NM (US)

(73) Assignee: Memx, Inc., Albuquerque, NM (US)

( * ) Notice: Subject to any disclaimer, the term of this patent is extended or adjusted under 35 U.S.C. 154(b) by 86 days.

(21) Appl. No.: 10/012,827

(22) Filed: Dec. 5, 2001

(65) Prior Publication Data

US 2003/0103313 A1 Jun. 5, 2003

(51) Int. Cl.$^7$ .................................................. H05F 3/00
(52) U.S. Cl. ....................................................... 361/222
(58) Field of Search ................................ 361/220, 222, 361/233, 234

(56) References Cited

U.S. PATENT DOCUMENTS

| 5,640,133 | A | 6/1997 | MacDonald et al. | ......... 333/197 |
| 5,798,283 | A | 8/1998 | Montague et al. | ............ 438/24 |
| 5,867,302 | A | 2/1999 | Fleming | ..................... 359/291 |
| 5,914,553 | A | 6/1999 | Adams et al. | ............... 310/309 |
| 5,986,381 | A | 11/1999 | Hoen et al. | ................. 310/309 |
| 6,082,208 | A | 7/2000 | Rodgers et al. | ............... 74/406 |
| 6,133,670 | A | 10/2000 | Rodgers et al. | ............. 310/309 |
| 6,175,170 | B1 | 1/2001 | Kota et al. | ..................... 310/40 |
| 6,253,001 | B1 | 6/2001 | Hoen | .......................... 385/17 |
| 2001/0048265 | A1 | 12/2001 | Miller et al. | ................. 310/309 |

Primary Examiner—Edward H. Tso
(74) Attorney, Agent, or Firm—Marsh Fischmann & Breyfogle LLP

(57) ABSTRACT

A low voltage method and system for controlling electrically activated microelectromechanical (MEM) actuators such as electrostatic comb actuators in reflective microstructure positioning systems are provided. In one embodiment, a low voltage control system (110) includes a single fixed DC voltage source (14) and a plurality of variable DC voltage sources (16). The fixed DC voltage source (14) is electrically connected to commonly connected first terminals (12a) of a plurality of MEM actuators (12) between the MEM actuators (12) and a reference potential (18). Each variable DC voltage source (16) is associated with a separate MEM actuator (12) and is electrically connected between the reference potential (18) and a second terminal (12b) of its associated MEM actuator (12). The fixed DC voltage source supplies a fixed DC voltage that is common to the MEM actuators (12). Each variable DC source (16) supplies a controllable DC voltage to its associated MEM actuator (12). The fixed and controllable voltages are selected to permit control of the variable DC voltage sources (16) using inexpensive control electronics.

40 Claims, 11 Drawing Sheets

LOW VOLTAGE CONTROL OF MEM ACTUATORS

FIELD OF THE INVENTION

The present invention relates generally to the control of electrically activated microelectromechanical (MEM) devices, and more particularly to the control of MEM actuators in reflective microstructure positioning systems.

BACKGROUND OF THE INVENTION

Through appropriate mechanical coupling structures, one or more electrically activated MEM actuators can be utilized to adjust the orientation of a positionable reflective microstructure (e.g., a mirror) fabricated on a substrate. One example of an electrically activated MEM actuator is an electrostatic comb actuator. Electrostatic comb actuators generally include at least one stationary or fixed comb side and one moveable comb side. The fingers of the fixed and moveable combs are interdigitated with one another. The fixed and moveable combs are essentially two electrodes that are capacitively coupled with one another. Upon application of a voltage across the capacitive gap between the fixed and moveable combs of the electrostatic comb actuator, an electrostatic force is developed that attracts the moveable comb side towards the fixed comb side. Movement of the moveable comb side in response to the electrostatic force results in a displacement (i.e., change in position) at the output of the actuator. Such a displacement can be transmitted through appropriate microfabricated linkages and flexures to achieve a desired displacement of a structure that adjusts the orientation of the reflective microstructure with respect to the substrate.

The electrostatic force, and thus the amount of displacement achieved, depends on the amount of voltage that is applied across the MEM actuator. Typically, the voltages required to operate electrostatic comb actuators are many tens of volts to over a hundred volts. As may be appreciated, in order to achieve precise control of the electrostatic force generated and thus the displacement achieved, the amount of voltage applied must be controlled with precision. This requires the use of appropriate control electronics. However, due to the high voltages required, conventional, and thus low cost and widely available, control electronics (e.g., CMOS control electronics) are often not appropriate for controlling operation of the actuator.

SUMMARY OF THE INVENTION

Accordingly, the present invention provides a method and system for controlling MEM actuators such as, for example electrostatic comb actuators, using low voltages. In one desired implementation of the present invention, the voltage required to achieve the desired displacement of the actuator is divided into two components: a fixed voltage component and a variable voltage component. The fixed voltage is supplied by a fixed DC voltage source. The variable voltage is supplied by variable DC voltage source. Only the variable DC voltage source needs to be precisely controlled. By choosing an appropriate fixed voltage, the range of the variable voltage can be small enough to permit the use of inexpensive, widely available, and potentially safer low voltage control electronics. Although the method and system of the present invention are particularly suited for controlling electrostatic-type actuators, the method and system of the present invention may also be applicable to the control of other types of microfabricated actuators such as, for example, piezo-type actuators that typically require high control voltages, or thermal-type actuators though most thermal-type actuators do not require high control voltages.

According to a first aspect of the present invention, a method of controlling an electrically activated MEM actuator includes the step of applying a first control voltage to the MEM actuator. Application of the first control voltage establishes a first total control voltage across the MEM actuator, and a first position of the MEM actuator is established based upon application of the first control voltage. After the first position is established, a second control voltage is applied to the MEM actuator while still applying the first control voltage. Application of the second control voltage in conjunction with the first control voltage establishes a second total control voltage across the MEM actuator that is different from the first total control voltage, and the MEM actuator is moved from the first position to a second position based upon application of the second control voltage. In one embodiment, the MEM actuator is part of a reflective microstructure positioning system fabricated on a substrate. The MEM actuator is positionable in a plurality of positions corresponding to different total control voltages across the MEM actuator to orient the reflective microstructure in a corresponding plurality of orientations with respect to the substrate. In this regard, when the MEM actuator is in the first position, the reflective microstructure is oriented in a first orientation relative to the substrate corresponding to this first position, and when the MEM actuator is in the second position, the reflective microstructure is oriented in a second orientation relative to the substrate corresponding to this second position.

The first control voltage may be supplied using a fixed DC voltage source in the case of the first aspect, and the second control voltage may be supplied using a variable DC voltage source electrically connected in series with the fixed DC voltage source. Where the MEM actuator comprises an electrostatic comb actuator, the first control voltage may be applied to a first terminal of the electrostatic comb actuator that is electrically connected to the moveable comb side of the electrostatic comb actuator, and the second control voltage may be applied to a second terminal of the electrostatic comb actuator that is electrically connected to the fixed comb side of the electrostatic comb actuator. Upon application, the second control voltage may establish a second total control voltage that is greater than or less than the first total control voltage established upon application of the first control voltage. Where the reflective microstructure positioning system is configured for tilting the reflective microstructure with respect to the substrate, the magnitude of the first control voltage may be such that the first total control voltage biases the actuator for operation within a range of voltages corresponding to a desired operating region on a curve representing the relationship between the total control voltage applied across the MEM actuator versus a tilt angle of the reflective microstructure with respect to the substrate. Stated another way, the first total control voltage may be selected such that a relatively small range of second control voltages across the MEM actuator produces a much larger displacement than the application of the first total control voltage across the MEM actuator.

According to a second aspect of the present invention, a method of controlling a plurality of electrically activated MEM actuators includes the step of applying a common first control voltage to all of the MEM actuators. Application of the first control voltage establishes a first total control voltage across each of the MEM actuators, and first positions of each of the MEM actuators are established based upon application of the first control voltage. After establishing the first position of the MEM actuator and while still applying the first control voltage, separate second control voltages are then applied to each of a selection of the MEM actuators (i.e., one or more of the MEM actuators). Application of the separate second control voltages establishes second total control voltages across each MEM actuator in the selection that is different from the first total control voltage, and each MEM actuator in the selection is moved from its corresponding first position to a corresponding second position based upon application of the separate second control voltages. In one embodiment, the MEM actuators are incorporated in at least one reflective microstructure positioning system fabricated on a substrate. Each MEM actuator is positionable in a plurality of positions corresponding to different total control voltages across the MEM actuator to orient an associated reflective microstructure in a corresponding plurality of orientations with respect to the substrate. In this regard, when the MEM actuators are in their respective first positions, the reflective microstructures associated with each of the MEM actuators are oriented in first orientations corresponding to the first positions, and when the MEM actuators are in their respective second positions, the reflective microstructures associated with each of the MEM actuators are oriented in second orientations corresponding to the second positions. Each of the various features discussed above in relation to the first aspect may be utilized by this second aspect of the invention as well, individually or in any combination.

According to a third aspect of the present invention, a system for controlling an electrically activated MEM actuator includes at least one fixed DC voltage source and at least one variable DC voltage source. The fixed DC voltage source is electrically connected between the MEM actuator and a reference potential. The variable DC voltage source is electrically connected in series with the fixed DC voltage source between the MEM actuator and the reference potential. The fixed DC voltage source is operable to supply a first voltage to the MEM actuator to establish a first position of the MEM actuator. The variable DC voltage source is operable to supply a second voltage to the MEM actuator in conjunction with the first voltage to establish a second position of the MEM actuator. In one embodiment, the MEM actuator is incorporated in a reflective microstructure positioning system fabricated on a substrate. The MEM actuator is positionable in a plurality of positions corresponding to different total control voltages across the MEM actuator to orient the reflective microstructure in a corresponding plurality of orientations with respect to the substrate. When the MEM actuator is in the first position, the reflective microstructure is oriented in a corresponding first orientation, and when the MEM actuator is in the second position, the reflective microstructure is oriented in a corresponding second orientation.

The fixed and/or variable DC voltage sources associated with the third aspect may be on-chip (i.e., fabricated on the same substrate as the MEM actuator) or off-chip components (e.g., discrete devices that are not fabricated on the substrate). Where the reflective microstructure positioning system is configured for tilting the reflective microstructure with respect to the substrate, the fixed DC voltage source can be selected to provide a fixed voltage within a range of voltages corresponding to a desired operating region on a curve representing the relationship between the total control voltage across the MEM actuator versus the tilt angle of the reflective microstructure with respect to the substrate. The variable DC voltage source may be operable to increase or decrease the total control voltage across the MEM actuator, and thus increase or decrease the displacement of the actuator. The fixed DC voltage source may be selected such that the range of voltages over which the variable DC voltage source operates can be appropriate for low voltage control electronics. In this regard, the variable DC voltage source may be operable to supply a range of second voltages that is no more than about 40 volts. Where the MEM actuator comprises an electrostatic comb actuator, the fixed DC voltage source may be electrically connected between the reference potential and a first terminal of the electrostatic comb actuator that is electrically connected to the moveable comb side of the electrostatic comb actuator, and the variable DC voltage source may be electrically connected between the reference potential and a second terminal of the electrostatic comb actuator that is electrically connected to the fixed comb side of the electrostatic comb actuator.

According to a fourth aspect of the present invention, a system for controlling a plurality of electrically activated MEM actuators includes at least one fixed DC voltage source and a plurality of variable DC voltage sources. The fixed DC voltage source is electrically connected between all of the MEM actuators and a reference potential. The variable DC voltage sources are electrically connected in series with the fixed DC voltage source, with each variable DC source being electrically connected between at least one associated MEM actuator and the reference potential. The fixed DC voltage source is operable to supply a first voltage to each of the MEM actuators to establish a first position of each MEM actuator. The variable DC voltage sources are operable to supply second voltages to their associated MEM actuators in conjunction with the first voltage to establish a second position of each of their associated MEM actuators. In one embodiment, the MEM actuators are part of one or more reflective microstructure positioning systems fabricated on a substrate. Each MEM actuator is positionable in a plurality of positions corresponding to different total control voltages applied across the MEM actuator to orient an associated reflective microstructure in a corresponding plurality of orientations with respect to the substrate. When the MEM actuators are in their first positions, their associated reflective microstructures are oriented in corresponding first orientations, and when the MEM actuators are in the second positions, their associated reflective microstructures are in corresponding second orientations. Each of the various features discussed above in relation to the third aspect may be utilized by this fourth aspect of the invention as well, individually or in any combination.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
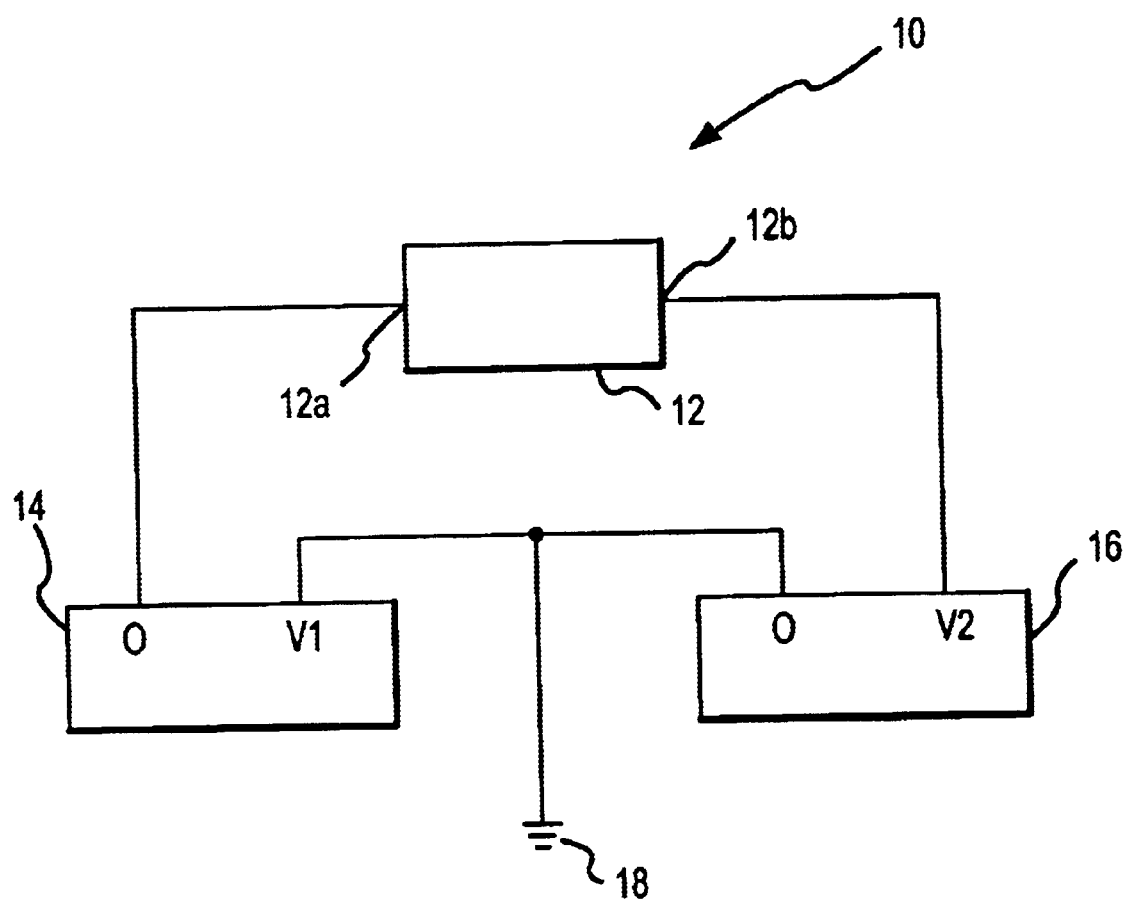
FIG. 1 is a schematic block diagram of one embodiment of a low voltage control system for controlling a MEM actuator.

Referring now to FIG. 1, there is shown a schematic diagram of one embodiment of a low voltage control system 10 for controlling an electrically activated MEM actuator 12. The MEM actuator 12 may be part of a reflective microstructure positioning system that is fabricated on a substrate. The system includes a fixed DC voltage source 14 and a variable DC voltage source 16. The fixed DC voltage source 14 is electrically connected between a first terminal 12a of the MEM actuator 12 and a reference potential 18 relative to which voltages in the control system 10 are specified (e.g., a floating potential, a system ground, or other fixed reference potential). The variable DC voltage source 16 is also electrically connected between the MEM actuator 12 and the reference potential 18, but is electrically connected to a second terminal 12b of the MEM actuator 12. In this regard, the fixed and variable DC voltage sources 14, 16 are electrically connected in series with one another and in series with the MEM actuator 12. It should be noted that, although the MEM actuator 12 in the illustrated embodiment is a two-terminal device (e.g., an electrostatic comb actuator having a moveable comb side and a fixed comb side), the concepts of the present invention may be applicable to MEM actuators having more than two-terminals.

During operation, the fixed DC voltage source 14 applies a fixed voltage V1 to the first terminal 12a of the MEM actuator 12. The fixed DC voltage source 14 may be always on when electrical power is supplied to the system 10, or it may be turned on and off as desired by an appropriate switching device (not shown). The variable DC voltage source 16 is controllable using appropriate control electronics to apply a range of voltages from 0 to V2 volts to the second terminal 12b of the MEM actuator 12. Thus, when the fixed DC voltage source 14 is on and the variable DC voltage source 16 is controlled to apply zero volts, the total voltage across the MEM actuator 12 is V1 volts, whereas when the variable DC voltage source 16 is controlled to apply V2 volts, the total voltage across the MEM actuator 12 is V1+V2 volts. By way of example, the fixed DC voltage source 14 may be a 50 V source and the variable DC voltage source 16 may be controllable to apply a range of voltages from 0 V to +20 V. Thus, a potential difference anywhere from 50V up to 70V may be established across the MEM actuator 12. It will be appreciated that 50V to 70V is a relatively high amount of voltage in the context of micro-fabricated structures and circuit elements. However, since the bulk of the voltage (50V) is supplied by the fixed DC voltage source 14, relatively inexpensive control electronics (e.g., CMOS components) can be employed to control operation of the variable DC voltage source 16.

Figure 2A:
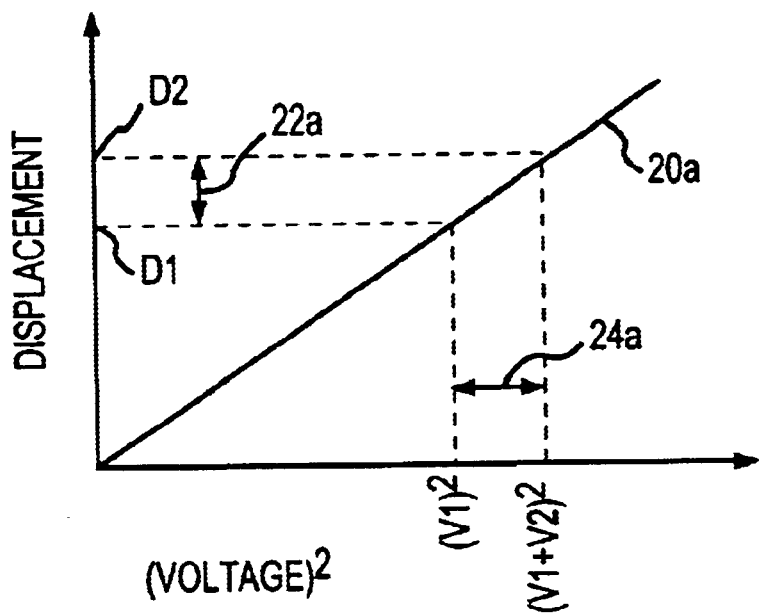
FIG. 2A is a plot of a displacement versus applied voltage transfer function curve for a linear MEM actuator biased by a fixed DC voltage at the low boundary of its controllable displacement range.

Referring now to FIG. 2A, there is shown a plot of the displacement versus applied voltage transfer function curve 20a for a linear MEM actuator 12. The displacement is measured at a reference point that moves in response to operation of the MEM actuator 12 (e.g., the end of an arm member coupled to the output of the MEM actuator). Depending upon how the reference point moves, the displacement may be measured in length units (e.g., microns) and/or angular units (e.g., degrees). Such a linear transfer function curve 20a is typical of a conventional electrostatic comb drive MEM actuator 12 having linear support springs. A voltage control system 10 such as shown in FIG. 1 is useful to control operation of a MEM actuator 12 having a linear transfer function such as shown. As is seen from the transfer function curve 20a, the displacement achieved by the MEM actuator 12 increases linearly with the square of the voltage across the MEM actuator 12. The MEM actuator 12 is biased to a first position D1 corresponding to the square of the fixed DC voltage V1 from the fixed DC voltage source 14. Additional displacement of the MEM actuator 12 from the first position D1 to a second position D2 is achieved by controlling the variable DC voltage source 16 to apply V2 volts to the second terminal 12b of the MEM actuator 12. Based on the amount of voltage supplied by the variable DC voltage source 16, the MEM actuator 12 may be displaced from the first position D1 to anywhere within a controllable displacement range 22a from the first position D1 to the second position D2 corresponding with a controllable voltage range 24a from $(V1)^2$ to $(V1+V2)^2$. As can be seen from the plot of FIG. 2A, since the transfer function curve 20a is linear and of moderate slope in the controllable voltage range 24a, the controllable displacement range 22a is fairly narrow.

Figure 2B:
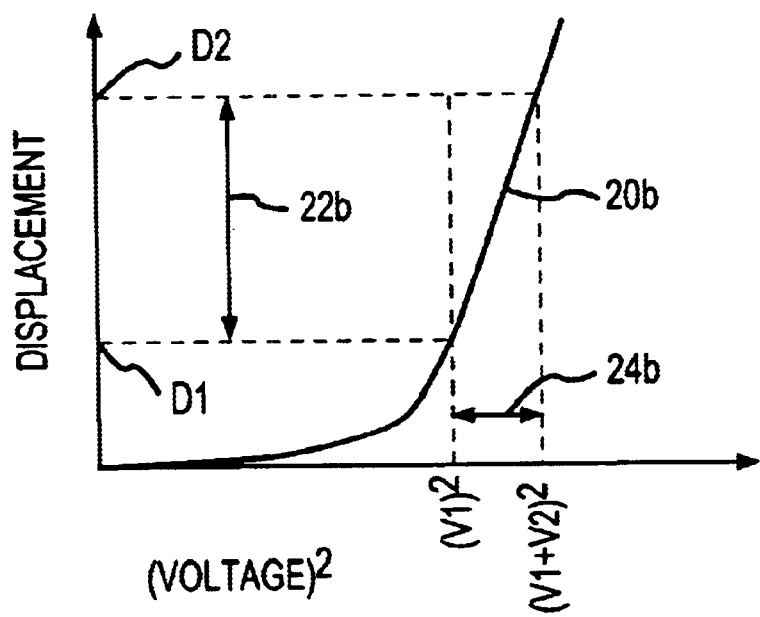
FIG. 2B is a plot of a displacement versus applied voltage transfer function curve for a non-linear MEM actuator biased by a fixed DC voltage at the low boundary of its controllable displacement range.

Referring now to FIG. 2B, there is shown a plot of the displacement versus applied voltage transfer function curve 20b for a non-linear MEM actuator 12. Such a non-linear transfer function curve 20b may be achieved by carefully tailoring one or more of the architecture and geometry of the MEM actuator 12, its suspension, and the mechanical load being driven. Examples of such MEM actuators 12 are discussed below in connection with FIGS. 3A–B. Due to the non-linear nature of the transfer function curve 20b of FIG. 2B, a voltage control system 10 such as shown in FIG. 1 is very advantageous in controlling operation of a MEM actuator 12 having a non-linear transfer function such as shown. As is seen from the transfer function curve 20b, the displacement achieved by the MEM actuator 12 increases non-linearly with only moderate displacement achieved at the first position D1 corresponding to $(V1)^2$. However, in the controllable voltage range 24b, the transfer function curve 20b steepens and a relatively large additional displacement from the first position D1 to the second position D2 is achieved when the variable DC voltage source 16 applies V2 volts to the second terminal 12b of the MEM actuator 12 (i.e., the slope of the transfer function curve 20b in the controllable voltage range 24b is significantly greater than the preceding portion of the curve 20b). In this regard, the controllable displacement range 22b is far greater for the non-linear transfer function curve 20b of FIG. 2B than for the linear transfer function curve 20b of FIG. 2A, while the controllable voltage range 24b remains the same.

Figure 2C:
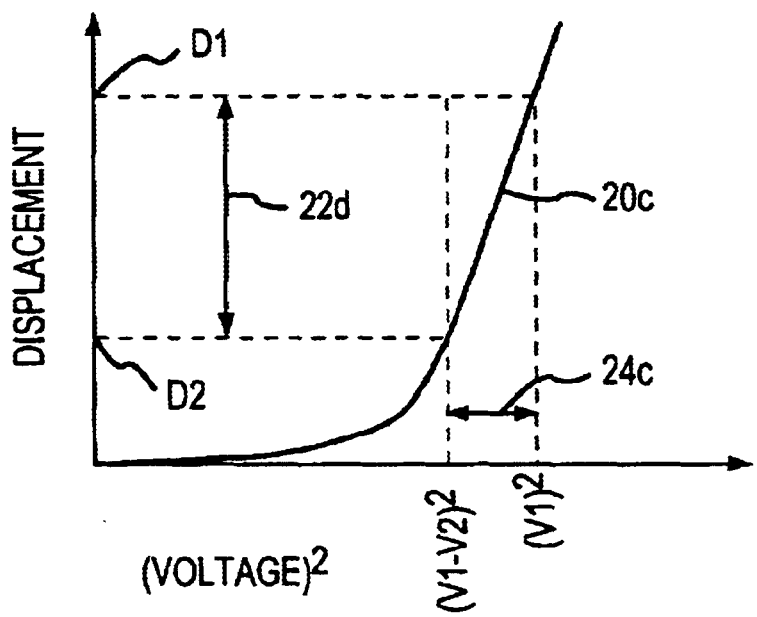
FIG. 2C is a plot of a displacement versus applied voltage transfer function curve for a non-linear MEM actuator biased by a fixed DC voltage at the high boundary of its controllable displacement range.
Figure 2D:
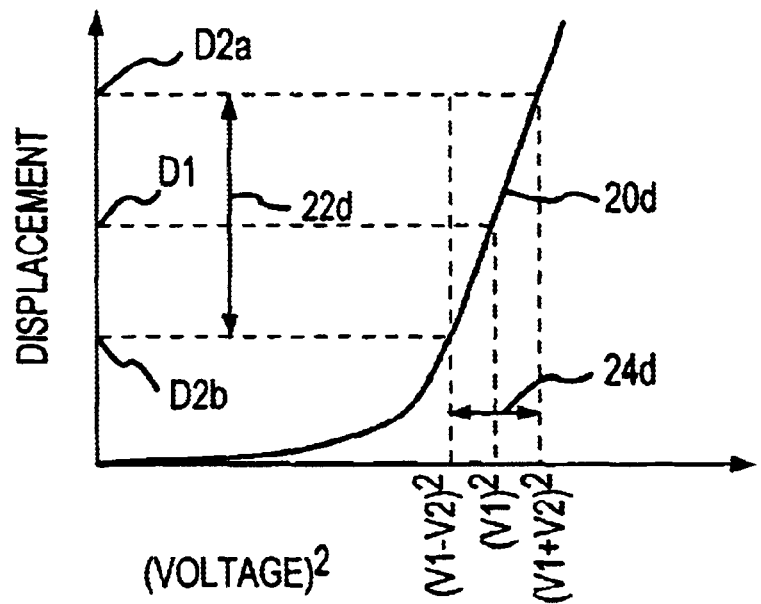
FIG. 2D is a plot of a displacement versus applied voltage transfer function curve for a non-linear MEM actuator biased by a fixed DC voltage between the low and high boundaries of its controllable displacement range.

As is shown in FIG. 2C, the fixed DC voltage V1 need not be only at the low boundary of the controllable voltage range 24c to bias the first position D1 of the MEM actuator 12 corresponding therewith at the low boundary of the controllable displacement range 22c. In this regard, the fixed DC voltage V1 supplied by the fixed DC voltage source 14 may at the high boundary of the controllable voltage range 24c to bias the first position D1 of the MEM actuator 12 corresponding therewith at the high boundary of the controllable displacement range 22c. The variable DC voltage V2 supplied by the variable DC voltage source 16 may then be negative to decrease the total voltage across the MEM actuator 12 and thereby decrease the displacement of the MEM actuator 12 from the first position D1. By way of example, V1 may be 70V and V2 may be controllable in the range of 0 to −20V to decrease the displacement of the MEM actuator 12 from the first position D1 to the second position D2. As is shown in FIG. 2D, the fixed DC voltage V1 supplied by the fixed DC voltage source 14 may be somewhere within the controllable voltage range 24d (e.g., in the middle or at some other intermediate location) to bias the first position D1 of the MEM actuator 12 corresponding therewith to be somewhere within the controllable displacement range 22d (e.g., in the middle or at some other intermediate location). The variable DC voltage V2 supplied by the variable DC voltage source 16 is either positive to increase the total voltage across the MEM actuator 12 and thereby increase the displacement of the MEM actuator 12 from the first position D1 to the second position D2a, or negative to decrease the total voltage across the MEM actuator 12 and thereby decrease the displacement of the MEM actuator 12 from the first position D1 to the second position D2b. For example, V1 may be 60V and V2 may be controllable in the range of −10V to +10V to either increase or decrease the displacement of the MEM actuator 12 from the first position D1 to one of the second positions D2a, D2b.

Figure 3A:
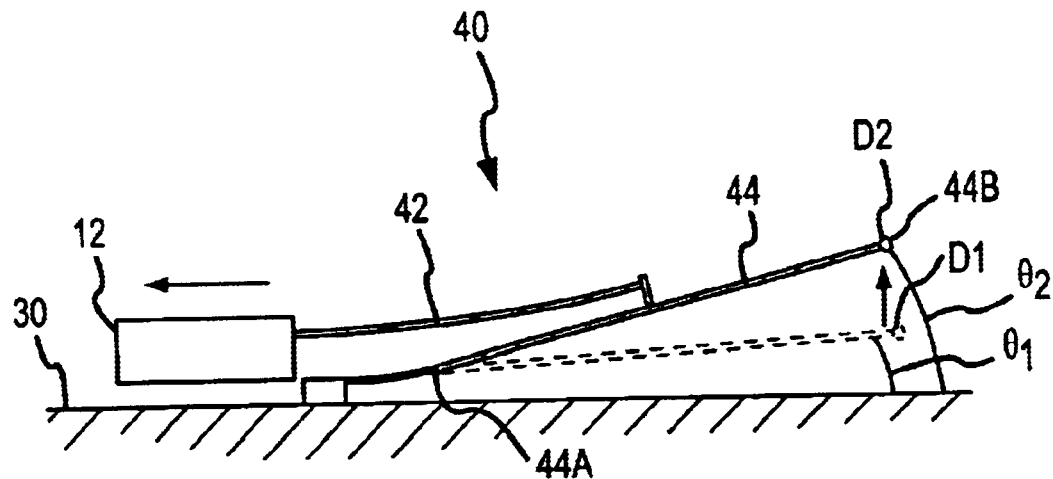
FIG. 3A is a side view of one embodiment of a MEM actuator positioning system that has a non-linear displacement versus applied voltage transfer function curve.

Referring now to FIG. 3A, there is shown a side view of an exemplary positioning system 40 that has a non-linear displacement versus applied voltage transfer function curve 20b similar to that shown in FIG. 2B. The positioning system of FIG. 3A includes an electrically actuated MEM actuator 12 that is coupled by a tether 42 to a lever arm member 44. The lever arm 44 is pivotably attached (e.g., by a compliant member) to the substrate 30 at a first end 44A thereof, and a second end 44B of the lever arm 44 is pivotable about the first end 44A. Any appropriate pivot location could be utilized (i.e., the pivot does not have to be at the first end 44A). Upon actuation of the MEM actuator 12, the tether 42 is pulled to the left, rotating the lever arm 44 about its first end 44A through an angle θ measured from the substrate 30. The magnitude of the vertical displacement at the second end 44B of the lever arm 44 is a function of the voltage applied across the MEM actuator 12. By applying the fixed DC voltage V1 to the MEM actuator 12, the lever arm 44 is rotated by a small angle $\theta_1$ moving the second end 44B of the lever arm 44 to the first vertically displaced position D1 (shown in outline form in FIG. 3A). When the variable DC voltage V2 is applied in series with V1, the lever arm 44 is pivoted through a larger angle $\theta_2$ moving the second end 44B of the lever arm 44 to the second vertically displaced position D2.

Figure 3B:
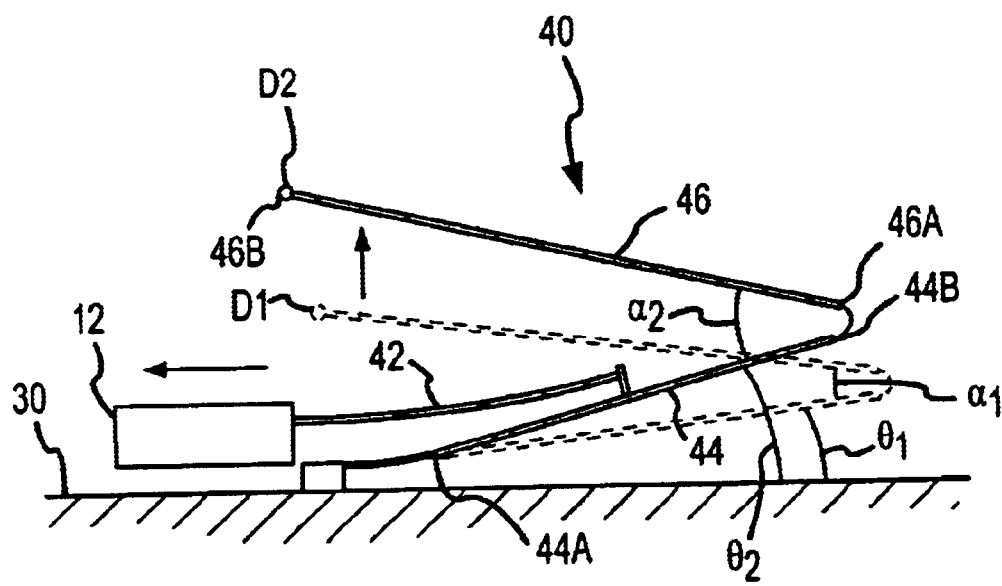
FIG. 3B is a side view of another embodiment of a MEM actuator positioning system that has a non-linear displacement versus applied voltage transfer function curve.

Referring now to FIG. 3B, the positioning system of FIG. 3A can be modified to include lower and upper lever arm members 44, 46. The lower lever arm 44 is pivotably attached (e.g., by a compliant member) to the substrate 30 at a first end 44A thereof, and a second end 44B of the lower lever arm 44 is pivotably attached (e.g., by a compliant member) to a first end 46A of the upper lever arm 46. Together, the lower and upper lever arms 44, 46 comprise a folded lifting mechanism. The folded lifting mechanism positioning system 40 of FIG. 3B also has a non-linear displacement versus applied voltage transfer function curve 20b similar to that shown in FIG. 2B. Upon actuation of the MEM actuator 12, the tether 42 is pulled to the left, rotating the lower lever arm 44 about its first end 44A through an angle θ measured from the substrate 30. If lateral movement of the second end 46B of the upper lever arm 46 is constrained, the upper lever arm 46B is rotated through an angle α measured from the lower lever arm 44 that is opposite in orientation from θ (e.g., α is clockwise when θ is counterclockwise), thereby displacing the second end 46B of the upper lever arm 46 vertically. The magnitude of the vertical displacement at the second end 46B of the upper lever arm 46 is a function of the voltage across the MEM actuator 12. By applying the fixed DC voltage V1 to the MEM actuator 12, the lower and upper lever arms 44, 46 are rotated by small angles $\theta_1$, $\alpha_1$ moving the second end 46B of the upper lever arm 46 to the first vertically displaced position D1 (shown in outline form in FIG. 3B). When the variable DC voltage V2 is applied in series with V1, the lower and upper lever arms 44 are rotated through larger angles $\theta_2$, $\alpha_2$ moving the second end 46B of the upper lever arm 46 to the second vertically displaced position D2.

Figure 4A:
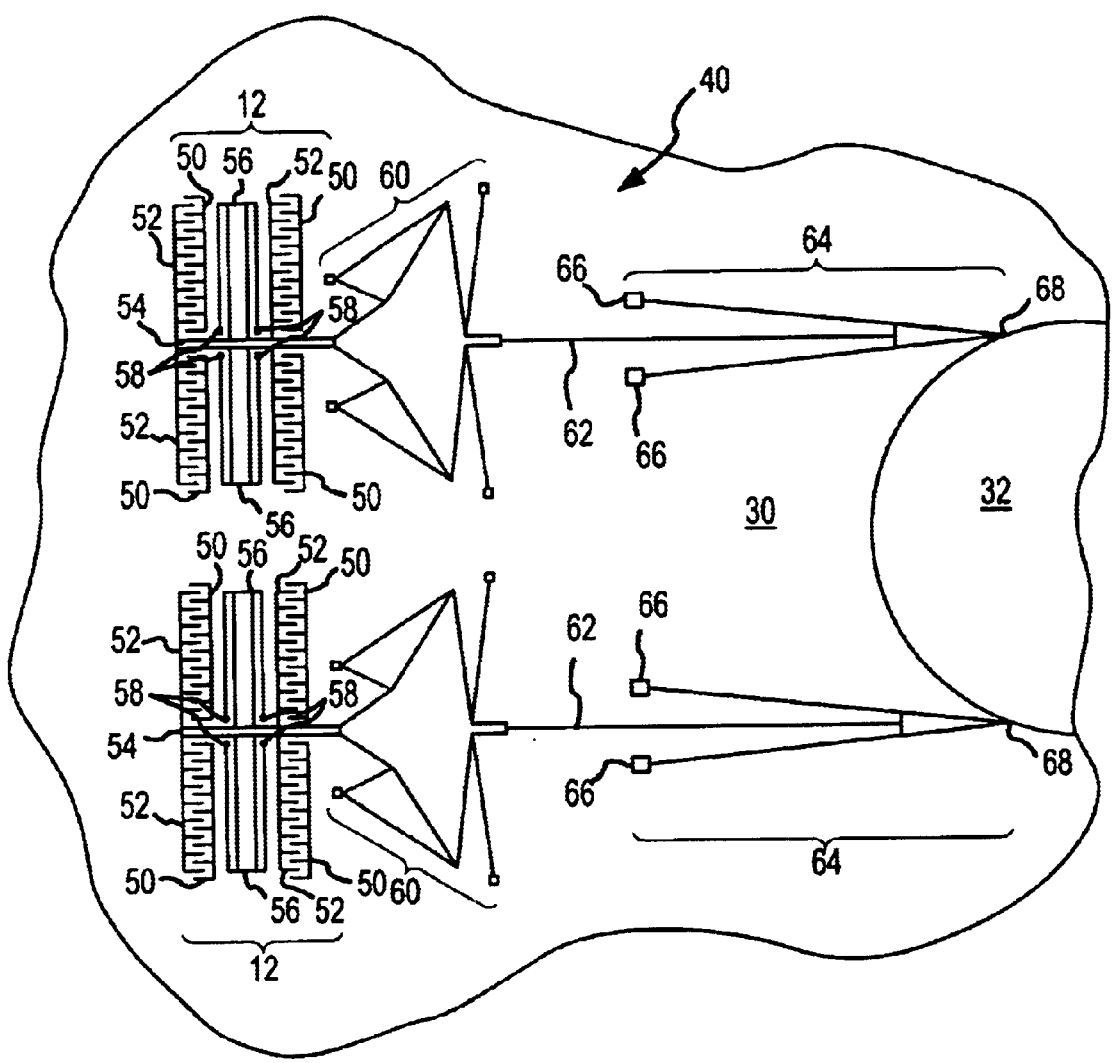
FIGS. 4A–B show top and side views, respectively, of an exemplary positioning system having two MEM actuators for positioning a reflective microstructure with one or two degrees of freedom.
Figure 4B:
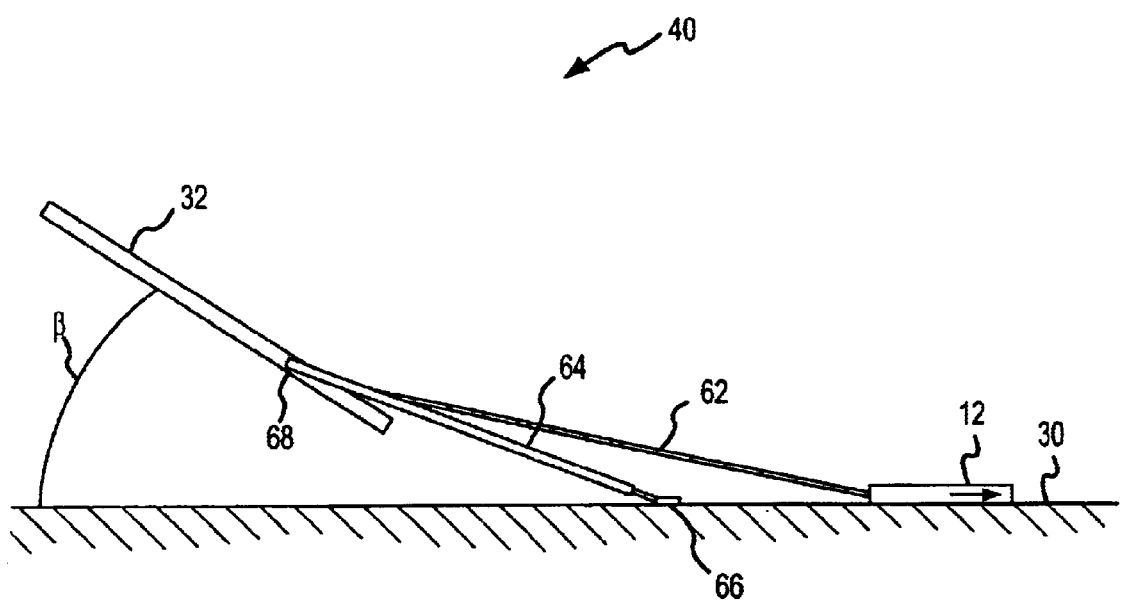

Referring now to FIGS. 4A–B, there are shown top and side views, respectively, of an exemplary positioning system 40 with which the control system 10 is particularly useful. The positioning system 40 is fabricated on a substrate 30 and includes a pair of electrically activated MEM actuators 12. In this regard, the MEM actuators 12 comprise electrostatic comb actuator microstructures. The positioning system 40 is operable to position a reflective microstructure 32 with two degrees of freedom with respect to the surface of the substrate 30. Each actuator 12 includes several stationary combs 50 that are fixed to the substrate 30 and several moveable combs 52 that are attached to a moveable frame 54. The moveable frame 54 is supported above the substrate 30 by a folded support spring 56 anchored to the substrate at four anchor points 58 to permit lateral movement of the frame 54 (i.e., at least generally parallel with the general extent of the substrate 30). Upon application of a control voltage via electrical interconnects (not shown) across the combs 50, 52, the moveable combs 52 are pulled laterally towards the stationary combs 50, thereby moving the frame 54 laterally. The amount of lateral movement corresponds with the magnitude of the actuation voltage applied.

The frame 54 is coupled through a displacement multiplier 60 to a tether 62. The tether 62 is connected to an A-frame structure 64. The A-frame structure 64 is pivotably anchored at its base 66 to the substrate 30 and is connected (e.g., by a compliant member) at its apex 68 to the reflective microstructure 44. Instead of being connected at its apex 68 to the reflective microstructure 32, the A-frame structure 64 may include a rigid extension arm (not shown) extending from its apex 68 which is connected at an opposite end thereof to the reflective microstructure 32. The displacement multiplier 60 amplifies the small lateral movement of the moveable frame 54 and also phase shifts the movement of the frame 54 by 180 degrees (i.e., lateral movement of the frame 54 to the right becomes lateral movement of the tether 62 to the left, and vice versa).

Because the A-frame structure 64 is pivotably anchored to the substrate 30 at its base 66, when the tether 62 is moved laterally, the apex 68 (and rigid extension arm, if any) of the A-frame structure 64 is pivoted upwardly through an arc to apply an upward force to the reflective microstructure 32 to lift the reflective microstructure 32 where it is attached to the A-frame structure 64 (or rigid extension arm, if any). In essence, the A-frame structures 64 (and rigid extension arms, if any) act as lever arms. The longer the lever arms comprised by the A-frame structures 64 (and rigid extension arms, if any) are, the greater the amount of upward displacement of the reflective microstructure 32 for a given angular displacement of the lever arm.

In addition to being connected to the A-frame structures 64, the reflective microstructure 32 may also be attached in a pivotable manner (e.g., by a compliant member) to the substrate 30. Since, the apexes 68 (or rigid extension arms) of the A-frame structures 64 are connected to different locations on the reflective microstructure 32, the reflective microstructure 32 can be tilted with one degree of freedom (as is shown in FIG. 4B) by applying equal actuation voltages to the combs 50, 52. Tilting of the reflective microstructure 32 with two degrees of freedom can be achieved by applying unequal actuation voltages to the combs 50, 52. In this regard, two separate basic control systems 10 such as illustrated in FIG. 1 may be employed to separately control the two MEM actuators 12. Alternatively, the basic control system 10 illustrated in FIG. 1 can be modified to make it particularly suitable for controlling the multiple MEM actuators 12. Notwithstanding the foregoing, the control system 10 may be used with any type of positioning system to achieve any type of movement of a reflective microstructure relative to the substrate on which the same is fabricated.

Figure 4C:
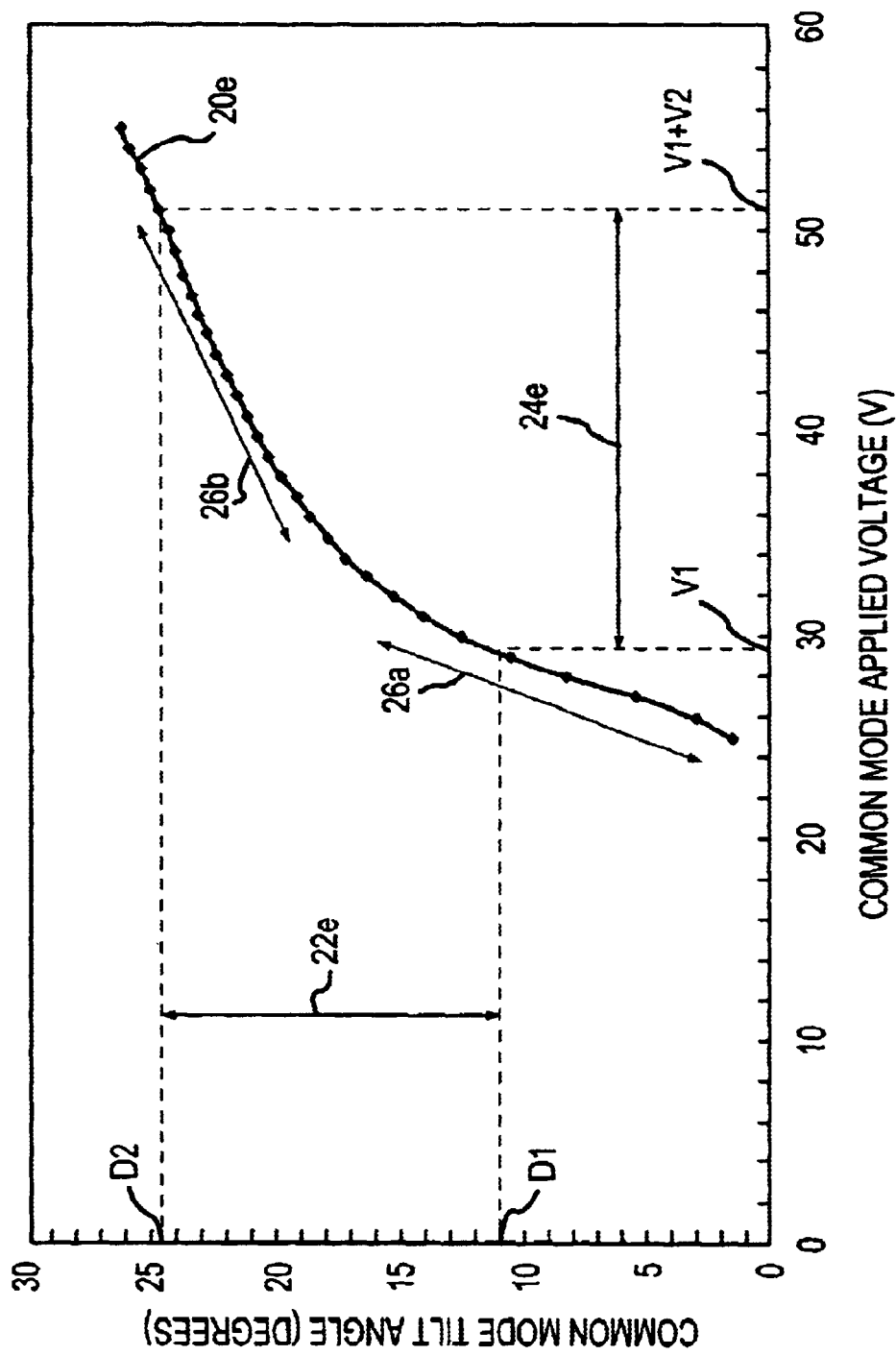
FIG. 4C is a plot of a tilt angle versus applied voltage transfer function curve typical of a positioning system such as shown in FIGS. 4A–B.

Referring now to FIG. 4C there is shown a plot of the transfer function curve 20e describing the relationship between the common mode voltage across the MEM actuators 12 and the corresponding common mode tilt angle β of the reflective microstructure 32 of a reflective microstructure positioning system 40 such as shown in FIGS. 4A–B. In this regard, "common mode" means that substantially equal voltages are applied across each of the MEM actuators 12 to achieve substantially equal actuation of the MEM actuators 12 and thereby tilt the reflective microstructure 32 with one degree of freedom. As can be seen from the plot, the overall transfer function curve 20e is non-linear but does have substantially linear portions 26a–b within the controllable voltage range 24e. As with the transfer function curves 20b shown in FIG. 2B, the fixed DC voltage V1 is chosen to be at the lower boundary of the controllable voltage range 24e to bias the MEM actuators 12 of the positioning system 40 so that the first position D1 is at the lower boundary of the controllable displacement range 22e. The variable DC voltage V2 is then controlled to increase the displacement (i.e., the common mode tilt angle β) of the reflective microstructure 32 from the first position D1 to the second position D2 corresponding with V1+V2 volts. It should be noted that the fixed DC voltage V1 may also be chosen so that the first position D1 is at the high boundary of the controllable displacement range 22e and application of the variable DC voltage V2 may decrease the common mode tilt angle β of the reflective microstructure 32, or the fixed DC voltage V1 may be chosen to bias the first position D1 to be somewhere between the high and low boundaries of the controllable displacement range 22e and application of the variable DC voltage V2 may, increase or decrease the common mode tilt angle β of the reflective microstructure 32 from the first position D1.

Figure 5:
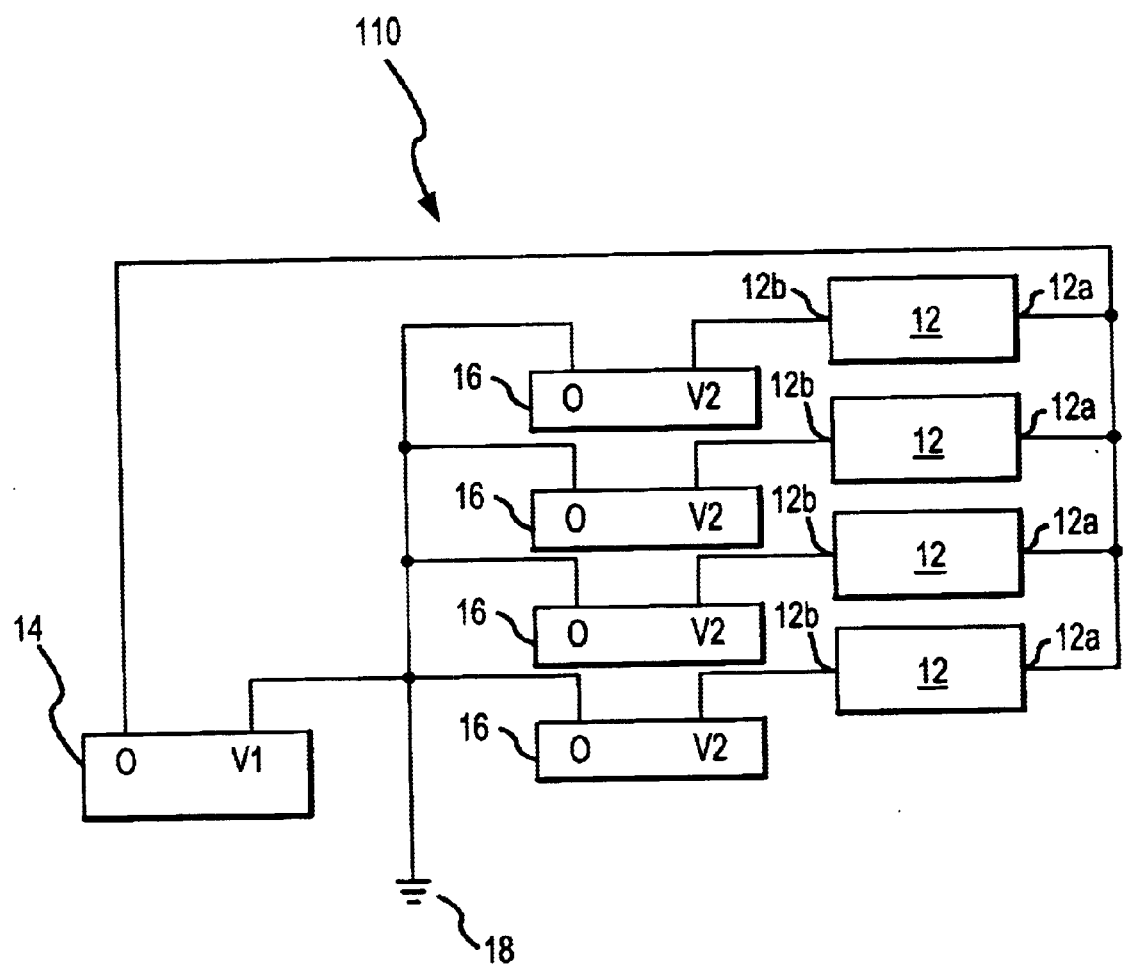
FIG. 5 is a schematic block diagram of an embodiment of a low voltage control system for controlling multiple MEM actuators.

Referring now to FIG. 5, there is shown a schematic diagram of one embodiment of a voltage control system 110 for controlling multiple electrically activated MEM actuators 12. The control system 110 of FIG. 5 is particularly suited for controlling the operation of arrays of reflective microstructure positioning systems 40 such as shown in FIG. 4 (e.g., the positioning systems 40 in a free-space optical cross connect switch with multiple positionable reflective microstructures). The control system 110 includes a single fixed DC voltage source 14 and a plurality of variable DC voltage sources 16. Each of the variable DC voltage sources 16 is associated with a separate one of a plurality of MEM actuators 12. In the presently described embodiment, there are four MEM actuators 12 and four variable DC sources 16 which would be appropriate for controlling the operation of an array of two reflective microstructure positioning systems 40 such as shown in FIG. 5. It is noted however, the control system 110 may include more or fewer variable DC sources 16 depending upon the number of MEM actuators 12 that are to be separately controllable.

The fixed DC voltage source 14 is electrically connected to commonly connected first terminals 12a of the MEM actuators 12 between the MEM actuators 12 and a reference potential 18. Each variable DC voltage source 16 is also electrically connected between its associated MEM actuator 12 and the reference potential 18, but is electrically connected to a second terminal 12b of its associated MEM actuator 12. Where the MEM actuators 12 are electrostatic comb actuators incorporated in a positioning system 40 such as described in FIG. 4, it is desirable that the second terminals 12b be electrically connected to the stationary combs 50 and that the first terminals 12a be electrically connected to the moveable combs 52. This is desirable because the movable combs 52 are mechanically coupled to other portions of the positioning system 40 and thus, unless appropriate electrically insulating materials are employed, the moveable combs 52 of the pair of MEM actuators 12 are electrically connected with one another and should be maintained at the same electrical potential to prevent potentially damaging current flow through the delicate components of the positioning system 40.

During operation, the fixed DC voltage source 14 applies the same fixed voltage V1 to the first terminals 12a of all of the MEM actuators 12. Each variable DC voltage source 16 is separately controllable using appropriate control electronics to apply a range of voltages from 0 to V2 volts to the second terminal 12b of its associated MEM actuator 12. Thus, when the fixed DC voltage source 14 is on and one of the variable DC voltage sources 16 is controlled to apply zero volts, the total voltage across its associated MEM actuator 12 is V1 volts, whereas when the same variable DC voltage source 16 is controlled to apply V2 volts, the total voltage across its associated MEM actuator 12 is V1+V2 volts. By way of example, the fixed DC voltage source 14 may be a 50 V source and the variable DC voltage sources 16 may be controllable to apply a range of voltages from 0 V to +20 V. Thus, anywhere from 50V up to 70V may be applied across each of the MEM actuators 12.

Figure 6:
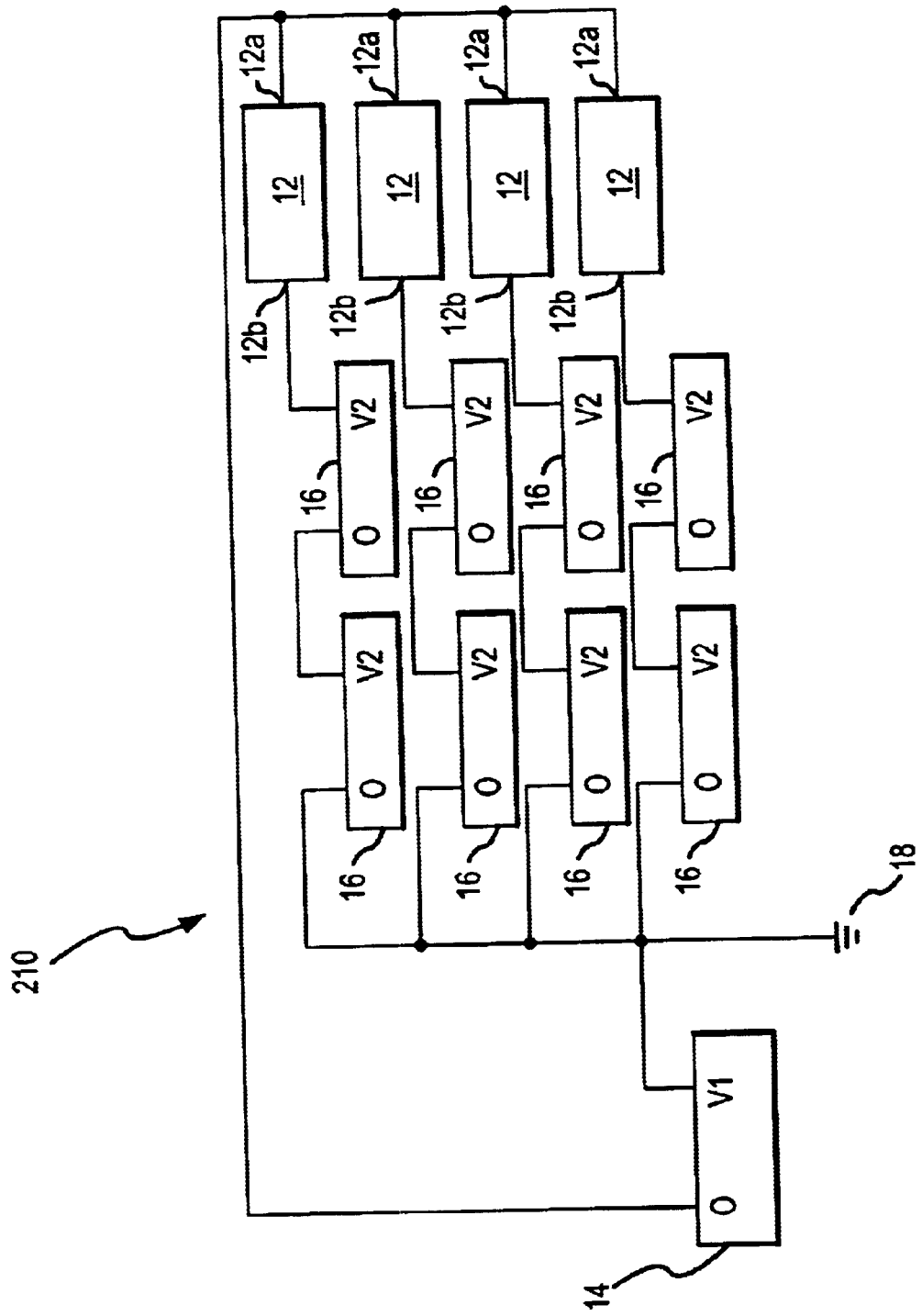
FIG. 6 is a schematic block diagram of another embodiment of a low voltage control system for controlling multiple MEM actuators.
Figure 7:
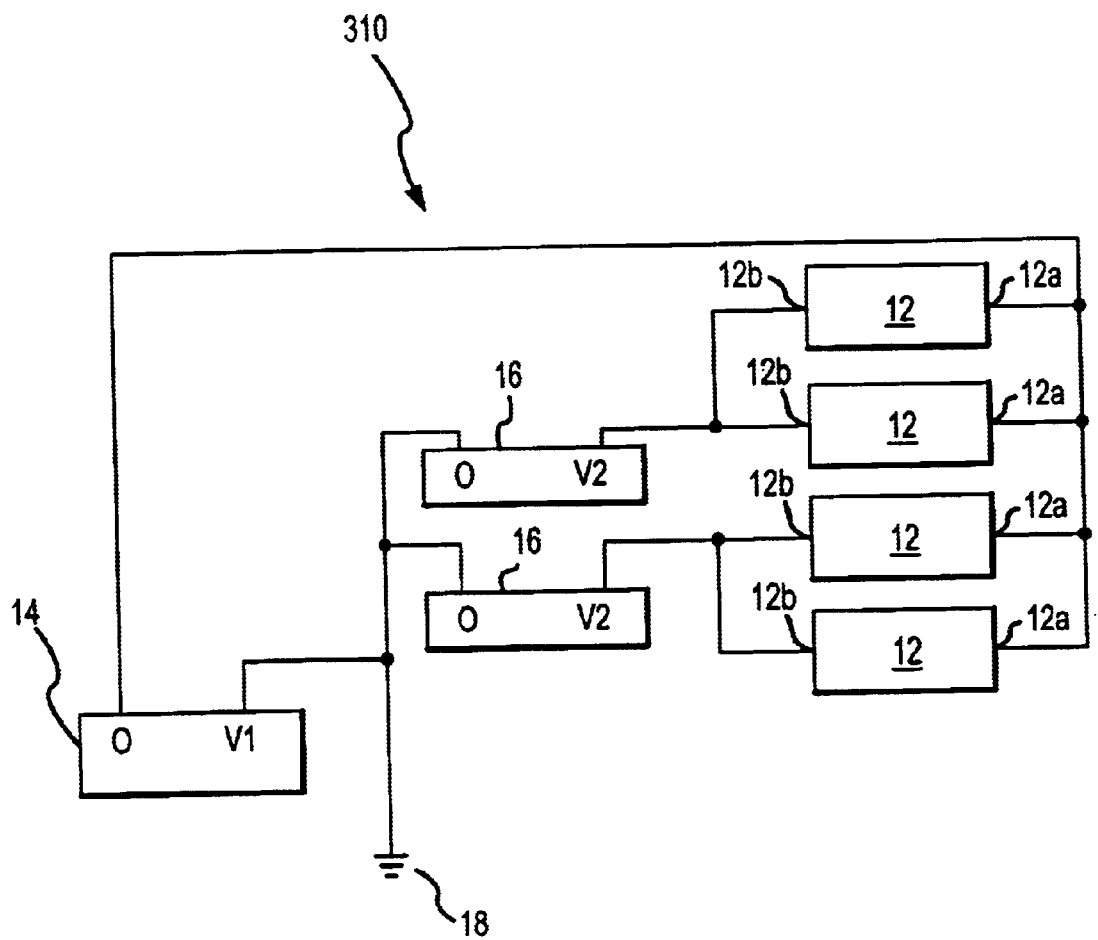
FIG. 7 is a schematic block diagram of a further embodiment of a low voltage control system for controlling multiple MEM actuators.
Figure 8:
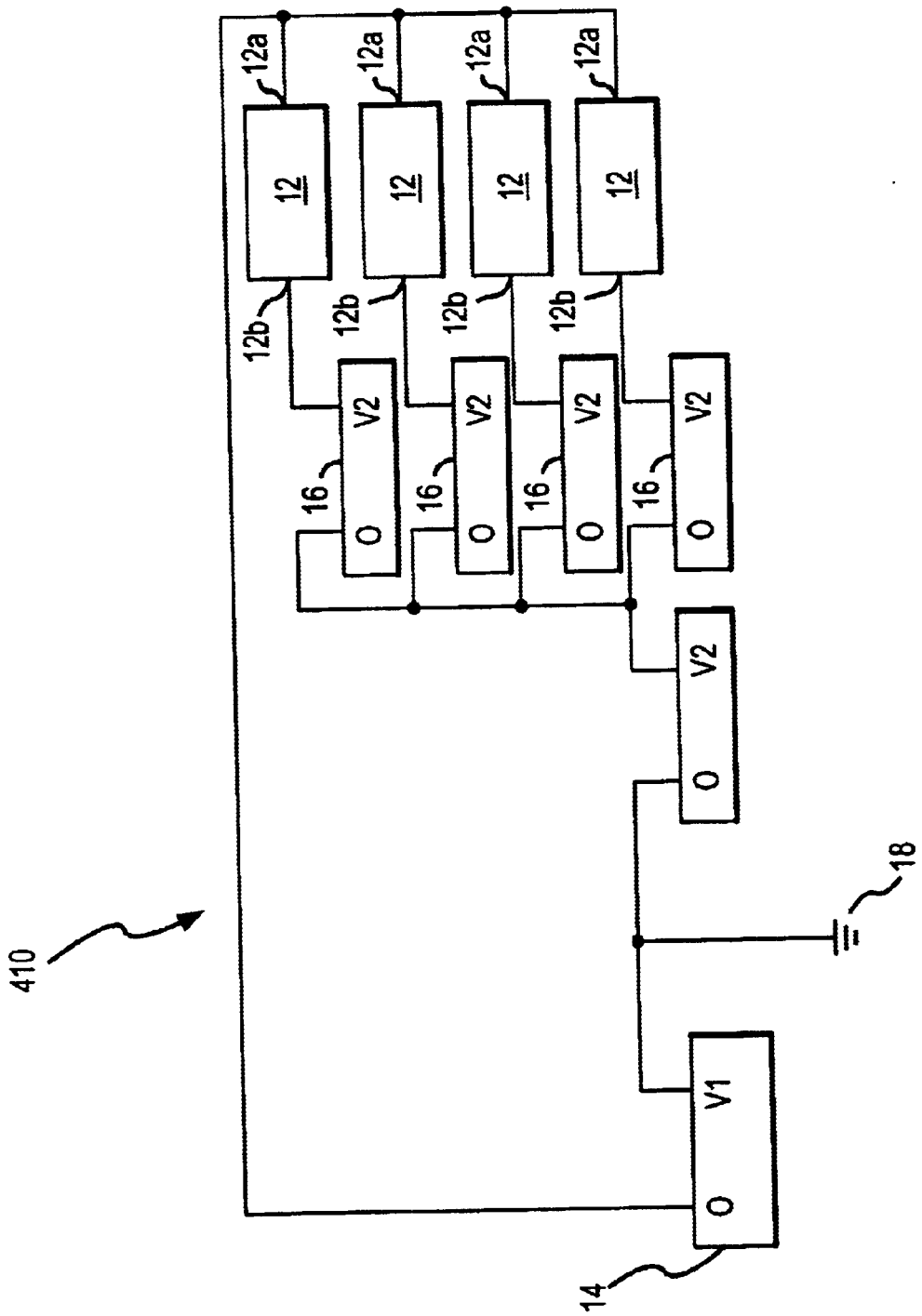
FIG. 8 is a schematic block diagram of one more embodiment of a low voltage control system for controlling multiple MEM actuators.

In the embodiments of the low voltage control system 10, 110 illustrated in FIGS. 1 and 5, there is only one variable DC voltage source 16 for each MEM actuator 12 to be controlled. It should be noted that additional variable DC voltage sources 16 may be placed back-to-back in series with one or more of the variable DC voltage sources 16, as desired. For example, where the variable DC voltage sources 16 are controllable in the range of 0 to +10V, two variable DC voltage sources 16 may be connected back-to-back in series with one another to provide a range of 0 to +20V. FIG. 6 shows an example of a low voltage control system 210 having two variable DC voltage sources 16 in series with one another for each MEM actuator 12. Likewise, more than one fixed DC source 14 may be placed back-to-back in series with one another. Furthermore, a single variable DC voltage source 16 can be electrically connected to more than one MEM actuator 12. For example, where it is desired to only position the reflective microstructure 32 of a positioning system 40 such as shown in FIG. 5 with one degree of freedom, a single variable DC voltage source 16 can be connected to each of the pair of MEM actuators 12 to supply the same control voltage across the MEM actuators 12. FIG. 7 shows an example of a low voltage control system 310 wherein each variable DC voltage source 16 is electrically connected to two MEM actuators 12. It is also possible to have one variable DC voltage source 16 that is common to several MEM actuators 12 connected in series with one or more variable DC voltage sources 16 associated with only one MEM actuator 12. FIG. 8 illustrates an example of such a voltage control system 410.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method of controlling an electrically activated microelectromechanical actuator of a reflective microstructure positioning system fabricated on a substrate, the microelectromechanical actuator being positionable in a plurality of positions corresponding to different total control voltages across the microelectromechanical actuator to orient the reflective microstructure in a corresponding plurality of orientations with respect to the substrate, said method comprising:

applying a first control voltage to the microelectromechanical actuator, wherein said applying a first control voltage step at least assists in establishing a first total control voltage across the microelectromechanical actuator;

establishing a first position of the microelectromechanical actuator based upon said applying a first control voltage step, wherein the reflective microstructure is oriented in a first orientation corresponding to the first position;

applying a second control voltage to the microelectromechanical actuator during said applying a first control voltage step and after said establishing a first position step, wherein said applying a second control voltage step at least assists in establishing a second total control voltage across the microelectromechanical actuator that is different from the first total control voltage; and moving the microelectromechanical actuator from the first position to a second position based upon said applying a second control voltage step, wherein the reflective microstructure is oriented in a second orientation corresponding to the second position.

2. The method of claim 1 wherein said applying a first control voltage step comprises using a fixed DC voltage source.

3. The method of claim 2 wherein said applying a second control voltage step comprises using a variable DC voltage source electrically connected in series with the fixed DC voltage source.

4. The method of claim 3, wherein said method further comprises the step of using a range of the variable DC voltage source that is no more than about 40 volts.

5. The method of claim 3 wherein the microelectromechanical actuator comprises an electrostatic comb actuator having a first terminal electrically connected to a moveable comb side of the actuator and a second terminal electrically connected to a fixed comb side of the actuator, wherein said applying a first control voltage step comprises applying the first control voltage to the first terminal, and wherein said applying a second control voltage step comprises applying the second control voltage to the second terminal.

6. The method of claim 1 wherein said applying a second control voltage step comprises establishing the second total control voltage at a greater magnitude than said first total control voltage associated with said applying a first control voltage step.

7. The method of claim 1 wherein said applying a second control voltage step comprises establishing the second total control voltage at a lesser magnitude than said first total control voltage associated with said applying a first control voltage step.

8. The method of claim 1 wherein said applying a second control voltage step comprises establishing the second total control voltage at a magnitude that is either greater or less than said first total control voltage associated with said applying a first control voltage step.

9. The method of claim 1 wherein the reflective microstructure positioning system is configured for tilting the reflective microstructure with respect to the substrate upon actuation of the microelectromechanical actuator, and wherein the first control voltage is within a range of voltages corresponding to a desired operating region on a curve representing the relationship between the total control voltage applied across the microelectromechanical actuator versus a tilt angle of the reflective microstructure with respect to the substrate.

10. The method of claim 1, wherein said method further comprises the step of selecting a magnitude for said first control voltage such that a range from said first total control voltage to said second total control voltage is no more than about 40 volts.

11. A method of controlling a plurality of electrically activated microelectromechanical actuators of at least one reflective microstructure positioning system fabricated on a substrate, wherein each microelectromechanical actuator is positionable in a plurality of positions corresponding to different total control voltages across the microelectromechanical actuator to at least assist in orienting an associated reflective microstructure in a corresponding plurality of orientations with respect to the substrate, said method comprising:

applying a common first control voltage to all of the microelectromechanical actuators, wherein said applying a first control voltage step at least assists in establishing a first total control voltage across each of the microelectromechanical actuators;

establishing first positions of each of the microelectromechanical actuators based upon said applying a first control voltage step, wherein the reflective microstructures associated with each of the microelectromechanical actuators are oriented in first orientations corresponding to the first positions;

applying separate second control voltages to each of a selection of the microelectromechanical actuators during said applying a common first control voltage step and after said establishing first positions step, wherein said applying separate second control voltages step at least assists in establishing second total control voltages across each microelectromechanical actuator in the selection that is different from the first total control voltage; and moving each microelectromechanical actuator in the selection from its corresponding first position to a corresponding second position based upon said applying a second control voltage step, wherein the reflective microstructures associated with each microelectromechanical actuator in the selection are oriented in second orientations corresponding to the second positions.

12. The method of claim 11 wherein said applying a first control voltage step comprises using a fixed DC voltage source.

13. The method of claim 12 wherein said applying separate second control voltages step comprises using separate variable DC voltage sources to apply separate second control voltages to each microelectromechanical actuator in the selection in series with the fixed DC voltage source.

14. The method of claim 11 wherein each of the microelectromechanical actuators comprises an electrostatic comb actuator having a first terminal electrically connected to a moveable comb side of the actuator and a second terminal electrically connected to a fixed comb side of the actuator, wherein said applying a first control voltage step comprises applying the first control voltage to the first terminal of each of the electrostatic comb actuators, and wherein said applying separate second control voltages step comprises applying the second control voltages to the second terminal of each corresponding electrostatic comb actuator in the selection.

15. The method of claim 11 wherein said applying separate second control voltages step comprises establishing the second total control voltages across each corresponding microelectromechanical actuator in the selection at a greater magnitude than said first total control voltage associated with said applying a first control voltage step.

16. The method of claim 11 wherein said applying separate second control voltages step comprises establishing the second total control voltages across each corresponding microelectromechanical actuator in the selection at a lesser magnitude than said first total control voltage associated with said applying a first control voltage step.

17. The method of claim 11 wherein said applying separate second control voltages step comprises establishing the second total control voltages across each corresponding microelectromechanical actuator in the selection at a magnitude that is either greater or less than said first total control voltage associated with said applying a first control voltage step.

18. The method of claim 11 wherein in said step of applying separate second control voltages, the second control voltages are of the same magnitude.

19. The method of claim 11 wherein in said step of applying separate second control voltages, at least two of the second control voltages are of different magnitude.

20. A system for controlling an electrically activated microelectromechanical actuator of a reflective microstructure positioning system fabricated on a substrate, the microelectromechanical actuator being positionable in a plurality of positions corresponding to different total control voltages across the microelectromechanical actuator to orient the reflective microstructure in a corresponding plurality of orientations with respect to the substrate, said system comprising:

at least one fixed DC voltage source electrically connected between the microelectromechanical actuator and a reference potential; and at least one variable DC voltage source electrically connected in series with said fixed DC voltage source and between the microelectromechanical actuator and said reference potential;

wherein said fixed DC voltage source is operable to supply a first voltage to the microelectromechanical actuator to establish a first position of the microelectromechanical actuator corresponding to a first orientation of the reflective microstructure, and wherein said variable DC voltage source is operable to supply a second voltage to the microelectromechanical actuator in conjunction with the first voltage to establish a second position of the microelectromechanical actuator corresponding to a second orientation of the reflective microstructure.

21. The system of claim 20 wherein the microelectromechanical actuator comprises an electrostatic comb actuator having a first terminal electrically connected to a moveable comb side of the electrostatic comb actuator and a second terminal electrically connected to a fixed comb side of the electrostatic comb actuator, and wherein said fixed DC voltage source is electrically connected between the first terminal of the electrostatic comb actuator and said reference potential and said variable DC voltage source is electrically connected between the second terminal of the electrostatic comb actuator and said reference potential.

22. The system of claim 20 wherein said variable DC voltage source is operable to increase the total control voltage across the microelectromechanical actuator.

23. The system of claim 20 wherein said variable DC voltage source is operable to decrease the total control voltage across the microelectromechanical actuator.

24. The system of claim 20 wherein said variable DC voltage source is operable to both increase and decrease the total control voltage across the microelectromechanical actuator.

25. The system of claim 20 wherein said variable DC voltage source is operable to supply a range of second voltages that is no more than about 40 volts.

26. The system of claim 20 wherein the reflective microstructure positioning system is configured for tilting the reflective microstructure with respect to the substrate upon actuation of the microelectromechanical actuator, and wherein said fixed DC voltage source is operable to supply a predetermined voltage within a range of voltages corresponding to a desired operating region on a curve representing the relationship between the total control voltage applied across the microelectromechanical actuator versus a tilt angle of the reflective microstructure with respect to the substrate.

27. The system of claim 20 wherein at least one of said fixed DC source and said variable DC source is fabricated on the substrate.

28. A system for controlling a plurality of electrically activated microelectromechanical actuators of at least one reflective microstructure positioning system fabricated on a substrate, wherein each microelectromechanical actuator is positionable in a plurality of positions corresponding to different total voltages across the microelectromechanical actuator to at least assist in orienting an associated reflective microstructure in a corresponding plurality of orientations with respect to the substrate, said system comprising:

- at least one fixed DC voltage source electrically connected between all of the microelectromechanical actuators and a reference potential; and
- a plurality of variable DC voltage sources, each said variable DC voltage source being electrically connected between at least one associated microelectromechanical actuator and said reference potential and in series with said fixed DC voltage source;
- wherein said fixed DC voltage source is operable to supply a first voltage to each of the microelectromechanical actuators to establish a first position of each microelectromechanical actuator corresponding to a first orientation of its associated reflective microstructure, and wherein said variable DC voltage sources are operable to supply second voltages to their associated microelectromechanical actuators in conjunction with the first voltage to establish a second position of each of their associated microelectromechanical actuators corresponding to a second orientation of each associated reflective microstructure.

29. The system of claim 28 wherein each microelectromechanical actuator comprises an electrostatic comb actuator having a first terminal electrically connected to a moveable comb side of the electrostatic comb actuator and a second terminal electrically connected to a fixed comb of the electrostatic comb actuator, and wherein said fixed DC voltage source is electrically connected between the first terminals of the electrostatic comb actuators and said reference potential and said variable DC voltage sources are electrically connected between the second terminal of their respective associated electrostatic comb actuators and said reference potential.

30. The system of claim 28 wherein said variable DC voltage sources are operable to increase the total control voltage across their associated microelectromechanical actuator.

31. The system of claim 28 wherein said variable DC voltage sources are operable to decrease the total control voltage across their associated microelectromechanical actuator.

32. The system of claim 28 wherein said variable DC voltage sources are operable to both increase and decrease the total control voltage across their associated microelectromechanical actuator.

33. The system of claim 28 said variable DC voltage sources are operable to supply a range of second voltages that is no more than about 40 volts.

34. The system of claim 28 wherein each reflective microstructure positioning system is configured for tilting its reflective microstructure with respect to the substrate upon actuation of its microelectromechanical actuators, and wherein said fixed DC voltage source is operable to supply a predetermined voltage within a range of voltages corresponding to a desired operating region on a curve representing the relationship between the total control voltage applied across the microelectromechanical actuators versus a tilt angle of the reflective microstructures with respect to the substrate.

35. The system of claim 28 wherein at least one of said fixed DC source and said variable DC sources are fabricated on the substrate.

36. The system of claim 28 further comprising:

- at least one additional variable DC voltage source electrically connected in series with at least one of said plurality of variable DC voltage sources.

37. The system of claim 28 wherein at least one of said plurality of variable DC voltage sources is electrically connected in series with at least two of the microelectromechanical actuators.

38. A system for controlling a plurality of electrically activated microelectromechanical actuators of at least one reflective microstructure positioning system fabricated on a substrate, wherein each microelectromechanical actuator is positionable in a plurality of positions corresponding to different total voltages across the microelectromechanical actuator to at least assist in orienting an associated reflective microstructure in a corresponding plurality of orientations with respect to the substrate, said system comprising:

- means for applying a fixed control voltage to all of the microelectromechanical actuators to establish a first position of each microelectromechanical actuator corresponding to a first orientation of its associated reflective microstructure; and
- means for applying separate variable control voltages to selected microelectromechanical actuators to effect actuation of the selected microelectromechanical actuators from their first positions to second positions by changing the total control voltages across the selected microelectromechanical actuators, wherein the second position of each selected microelectromechanical actuator corresponds to a second orientation of its associated reflective microstructure.

39. The system of claim 38 wherein said means for applying a fixed control voltage comprises a fixed DC voltage source electrically connected between all of the microelectromechanical actuators and a reference potential.

40. The system of claim 38 wherein said means for applying separate variable control voltages across selected microelectromechanical actuators comprises a plurality of variable DC voltage sources electrically connected in series with said fixed DC voltage source, each said variable DC source being electrically connected between at least one associated microelectromechanical actuator and said reference potential.

* * * * *